US012701604B2

(12) United States Patent
Christoffersson et al.

(10) Patent No.: US 12,701,604 B2
(45) Date of Patent: Aug. 4, 2026

(54) RADIO NETWORK NODE, UE AND METHODS PERFORMED THEREIN

(71) Applicant: Telefonaktiebolaget LM Ericsson (publ), Stockholm (SE)

(72) Inventors: Jan Christoffersson, Luleå (SE); Henrik Enbuske, Stockholm (SE); Tuomas Tirronen, Helsinki (FI); Andreas Höglund, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 375 days.

(21) Appl. No.: 18/033,190

(22) PCT Filed: Oct. 21, 2021

(86) PCT No.: PCT/SE2021/051055
§ 371 (c)(1),
(2) Date: Apr. 21, 2023

(87) PCT Pub. No.: WO2022/086420
PCT Pub. Date: Apr. 28, 2022

(65) Prior Publication Data
US 2023/0371066 A1     Nov. 16, 2023

Related U.S. Application Data

(60) Provisional application No. 63/094,914, filed on Oct. 22, 2020.

(51) Int. Cl.
*H04W 74/00* (2009.01)
*H04W 72/02* (2009.01)

(52) U.S. Cl.
CPC ......... *H04W 74/002* (2013.01); *H04W 72/02* (2013.01)

(58) Field of Classification Search
CPC ...... H04W 4/70; H04W 72/02; H04W 74/002
See application file for complete search history.

(56) References Cited

U.S. PATENT DOCUMENTS 11,737,145 B2 * 8/2023 Koskinen .............. H04W 72/23
                                                    370/329
11,864,240 B2 * 1/2024 Wong ............... H04W 72/0453
                (Continued)

FOREIGN PATENT DOCUMENTS

EP        3742858 A1     11/2020
WO    2019141061 A1      7/2019

OTHER PUBLICATIONS

PCT International Search Report and Written Opinion for International Application No. PCT/SE2021/051055 mailed Feb. 25, 2022, 14 pages.

(Continued)

*Primary Examiner* — Liton Miah
(74) *Attorney, Agent, or Firm* — Sage Patent Group

(57) ABSTRACT

A method performed by a user equipment (UE) for handling communication in a wireless communications network is described. The UE obtains an indication of a first size of a grant for a first type of data transmission and transmits an access request to a radio network node to perform data transmission of the first type of data transmission. Then the UE receives a grant from the radio network node. The grant indicates a size for granted data transmission, or comprises a type indication of type of data transmission of the granted data transmission. The UE compares the first size with the indicated size in the grant, or the first type of data transmission and the type of data transmission indicated by the type indication in the received grant, and based on the comparison, determines whether to use the received grant for performing data transmissions or not.

18 Claims, 16 Drawing Sheets

(56)         References Cited

U.S. PATENT DOCUMENTS

| | | | | |
|---|---|---|---|---|
| 2019/0357178 A1* | 11/2019 | Bae | ....................... | H04L 5/0044 |
| 2020/0221501 A1* | 7/2020 | Han | ....................... | H04L 1/1854 |
| 2020/0344818 A1* | 10/2020 | Höglund | ............ | H04W 74/004 |
| 2020/0383134 A1* | 12/2020 | Tirronen | ............. | H04W 74/004 |
| 2021/0058823 A1* | 2/2021 | Liu | ....................... | H04L 5/0048 |
| 2021/0076383 A1* | 3/2021 | Wong | ................... | H04W 76/28 |

OTHER PUBLICATIONS

Qualcomm Incorporated, "Rach Based NR Small Data Transmission", 3GPP TSG-RAN WG2 Meeting #111e, R2-2007540, Online, Aug. 17-28, 2020, 5 pages.
3GPP, Technical Specification Group Radio Access Network, NR, Radio Resource Control (RRC) protocol specification (Release 16), 3GPP TS 38.331.V16.1.0 (Jul. 2020), Valbonne France, 906 pages.
Ericsson, "New SID on Support of Reduced Capability NR Devices", 3GPP TSG RAN Meeting #86, RP-193238, Sitges, Spain, Dec. 9-12, 2019, 5 pages.
ZTE Corporation, "Work Item on NR smalldata Transmissions in Inactive State ", 3GPP TSG RAN Meeting #86, RP-200954 (Update of RP-193252), Sitges, Spain, Dec. 9-12, 2019, 5 pages.
3GPP, Technical Specification Group Radio Access Network, NR, Medium Access Control (MAC) protocol specification (Release 16), 3GPP TS 38.321.V16.1.0 (Jul. 2020), Valbonne France, 151 pages.

* cited by examiner

| | |
|---|---|
| UE Contention Resolution Identity | Oct 1 |
| UE Contention Resolution Identity | Oct 2 |
| UE Contention Resolution Identity | Oct 3 |
| UE Contention Resolution Identity | Oct 4 |
| UE Contention Resolution Identity | Oct 5 |
| UE Contention Resolution Identity | Oct 6 |
| R \| Channel Access-CPext \| TPC \| HARQ Feedback Timing Indicator | Oct 7 |
| PUCCH Resource Indicator \| Timing Advance Command | Oct 8 |
| Timing Advance Command | Oct 9 |
| C-RNTI | Oct 10 |
| C-RNTI | Oct 11 |

Fig. 5D

808.
Communication interface

10. UE

801. Processing circuitry

805. Memory

10. UE

802. Obtaining unit

804. Determining unit

803. Transmitting unit

801. Processing circuitry

805. Memory

807

806

12. Radio network node

908.
Communication
interface

901. Processing circuitry

905. Memory

12. Radio network node

902. Configuring unit

903. Receiving unit

904. Transmitting unit

901. Processing circuitry

905. Memory

907

906

RADIO NETWORK NODE, UE AND METHODS PERFORMED THEREIN

CROSS-REFERENCE TO RELATED APPLICATIONS

This application is a 35 U.S.C. § 371 national stage application for International Application No. PCT/SE2021/051055, entitled "RADIO NETWORK NODE, UE AND METHODS PERFORMED THEREIN", filed on Oct. 21, 2021, which claims priority to U.S. Provisional Application No. 63/094,914, entitled "RADIO NETWORK NODE, UE AND METHODS PERFORMED THEREIN", filed on Oct. 22, 2020 assigned to the assignee hereof, and expressly incorporated herein by reference.

TECHNICAL FIELD

Embodiments herein relate to a radio network node, a UE and methods performed therein regarding wireless communication. In particular, embodiments herein relate to handling communication, such as handling or controlling access to a radio network node, in a wireless communications network.

BACKGROUND

In a typical wireless communications network, user equipment (UE), also known as wireless communication devices, mobile stations, stations (STA) and/or wireless devices, communicate via a Radio Access Network (RAN) with one or more core networks (CN). The RAN covers a geographical area which is divided into service areas or cells, with each service area or cell being served by a radio network node such as an access node e.g. a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and investigate e.g. enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and coming 3GPP releases, such as New Radio (NR), are worked on. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

A new Work Item (WI) RP-200954 'New Work Item on NR small data transmissions in INACTIVE state' has been approved in 3GPP with the focus of optimizing the transmission for small data payloads by reducing the signaling overhead. The WI contains the following relevant objectives:

This work item enables small data transmission in RRC_INACTIVE state as follows:
- For the RRC_INACTIVE state:
  - ○ UL small data transmissions for random access channel (RACH)-based schemes, i.e., 2-step and 4-step RACH:
    - ■ General procedure to enable user plane (UP) data transmission for small data packets from INACTIVE state, e.g. using message A (MSGA) or message 3 (MSG3), [RAN2]
    - ■ Enable flexible payload sizes larger than the release (Rel)-16 common control channel (CCCH) message size that is possible currently for INACTIVE state for MSGA and MSG3 to support UP data transmission in UL. actual payload size can be up to network configuration, [RAN2]
    - ■ Context fetch and data forwarding, with and without anchor relocation, in INACTIVE state for RACH-based solutions [RAN2, RAN3]

-continued

Note 1: The security aspects of the above solutions should be checked with SA3
○ Transmission of UL data on pre-configured physical uplink shared channel (PUSCH) resources, i.e. reusing the configured grant type 1, - when timing advance (TA) is valid
■ General procedure for small data transmission over configured grant type 1 resources from INACTIVE state [RAN2]
■ Configuration of the configured grant type1 resources for small data transmission in UL for INACTIVE state [RAN2]

For narrow band internet of things (NB-IoT) and LTE-Machine Type Communication (MTC), LTE-M, similar signaling optimizations for small data have been introduced through Rel-15 Early Data Transmission (EDT) and Rel-16 Preconfigured Uplink Resources (PUR). Somewhat similar solutions may be expected for NR with the difference that the Rel-17 NR Small Data is only to be supported for radio resource control (RRC) INACTIVE state, which includes also 2-step RACH based small data, and that it should also include regular complexity mobile broadband (MBB) UEs. Both support mobile originated (MO) traffic only.

Within the context of Small Data Transmission (SDT) the possibility of transmitting subsequent data has been discussed, meaning transmission of further segments of the data that cannot fit in the Msg3 Transport Block. Such segments of data can be transmitted either in RRC_CONNECTED as in legacy after the 4-step RACH procedure has been completed, or they can be transmitted in RRC_INACTIVE before the UE transitions to RRC_CONNECTED. In the former case the transmission will be more efficient as the gNB and UE are appropriately configured based on the current UE channel conditions, while in the latter case several optimization are not in place yet, especially if the UE has moved while not connected, and also the transmission may collide with the transmission from other UEs as the contention has not been resolved yet.

The Work Item has already started in 3GPP meeting RAN2 #111-e, and the following relevant agreements have already been made:

Small data transmission with RRC message is supported as baseline for random access (RA)-based and configured grant (CG) based schemes The 2-step RACH or 4-step RACH should be applied to RACH based uplink small data transmission in RRC_INACTIVE The uplink small data can be sent in MSGA of 2-step RACH or msg3 of 4-step RACH.

Small data transmission is configured by the network on a per data radio bearer (DRB) basis Data volume threshold is used for the UE to decide whether to do SDT or not. For further study (FFS) how data volume is calculated.

FFS if an "additional SDT specific" reference signal received power (RSRP) threshold is further used to determine whether the UE should do SDT.

UL/DL transmission following UL SDT without transitioning to RRC_CONNECTED is supported.

When UE is in RRC_INACTIVE, it should be possible to send multiple UL and DL packets as part of the same SDT mechanism and without transitioning to RRC_CONNECTED on dedicated grant. FFS on details and whether any indication to network is needed RRC States From RRC layer point of view the UE can be camping in the cell in either one of three different states, RRC_IDLE, RRC_INACTIVE and RRC_CONNECTED.

In RRC_IDLE the UE is not connected to the Core Network (CN) but a series of mechanisms allow the UE to monitor the Paging channel while saving energy. In RRC_CONNECTED the UE is connected to the CN and it can perform unicast data transfer. Usually in this connected state the UE monitors more frequently the downlink control channel in order to react quickly to DL transmissions but by doing so it consumes more energy. RRC_INACTIVE is a new state introduced in NR which put together aspects from the other two states. In fact, the UE is connected to the CN but it is also configured to save energy by employing a behavior similar to the one in RRC_IDLE.

It is herein assumed that the UE is camping in the cell in RRC_INACTIVE and it might move to RRC_CONNECT to perform some of the data transfers required.

The transition from one state to another is controlled by the RRC layer, and specifically by the gNB, which sends appropriate messages to confirm the state transition. In FIG. 1, taken from TS 38.331 v.15.0.0 all the possible state transitions are shown with the relative RRC Message.

FIG. 1 shows UE state machine and state transitions in NR

Herein the following cases are considered:

If the UE is in RRC_INACTIVE and receives RRCRelease with suspendConfig indication it will stay in RRC_INACTIVE If the UE is in RRC_INACTIVE and receives RRCResume, it will move to RRC_CONNECTED If the UE is in RRC_CONNECTED and receives RRCRelease with Suspend indication it will move to RRC_INACTIVE Random Access Procedures The 4-step RACH procedure can be triggered by the UE in order to acquire radio resources from the network in order to transmit or receive data. In legacy, the scope of the 4-step RACH procedure, beyond synchronizing with the gNB, is to go in RRC_CONNECTED.

The 4-step Random Access procedure is illustrated in FIG. 2. After receiving the random access configuration, the UE first transmits a random preamble in the physical random access channel (PRACH) channel with the possibility of colliding with other UEs sending the same preamble. Then, the UE receives Msg2 or random access response (RAR) which contains the Timing Advance command used to synchronize the time offset of the UE with the frame structure used by the gNB. It also contains an UL grant to transmit a following message.

The following message transmitted by the UE is Msg3, which contains the first RRC message with which the UE requests a state transition to the gNB. In this context this message is RRCResumeRequest. This message also contains a UE identifier, used by the gNB to retrieve the UE context and act appropriately since the UE has already some configurations to be considered. In the context of EDT/SDT this message may contain also user data.

Finally, in Msg4 the gNB sends a Contention Resolution ID, which consists in a copy of the previous transmission used by the UE to determine if a possible collision has been resolved, colliding UEs will send different Msg3s, so only one UE will have a matching Contention Resolution ID. Msg4 may also contain the last RRC message which determines the state transition. Typically, in legacy, this message is the RRCResume so that the UE can move to RRC_CONNECTED and start the data transfer, but in the context of EDT or SDT Msg4 may also comprise RRCRelease which terminates the transition if user data has been transmitted in Msg3.

Selection of Preamble Group

In the 4-step RA procedure, the UE will select one preamble group out of two preamble groups, for example, preamble group A and preamble group B, if two groups have been configured. The selection is indicated to the gNB by the selected preamble, the preambles for contention based RA are all mapped to one of the groups, where the mapping is provided to UE via system information broadcast. The selection is done to indicate the anticipated Msg3 size in order for the gNB to give a sufficient grant for Msg3 transmission. The preamble group A would typically be designed to give a minimum grant to ensure that all UEs in the cell have sufficient coverage for Msg3 transmission. Minimum size also means that the grant is sufficient to fit the possible CCCH messages, RRC messages transmitted on signalling radio bearer zero (SRB0), since these cannot be segmented. Preamble group B is used to indicate that the UE has more data than a threshold (ra-Msg3SizeGroupA), and therefore would like to receive a larger grant. The corresponding section in 38.321 v16.0.0:

> 3> if Random Access Preambles group B is configured:
>> 4> if the potential Msg3 size (UL data available for transmission plus MAC subheader and, where required, medium access control control elements (MAC CE)) is greater than ra-Msg3SizeGroupA and the pathloss is less than power, PCMAX, (of the Serving Cell performing the Random Access Procedure)—preambleReceivedTargetPower—msg3-DeltaPreamble—messagePowerOffsetGroupB; or
>> 4> if the Random Access procedure was initiated for the CCCH logical channel and the CCCH SDU size plus MAC subheader is greater than ra-Msg3SizeGroupA:
>>> 5> select the Random Access Preambles group B.
>> 4> else:
>>> 5> select the Random Access Preambles group A.

When the UE transmits the selected preamble on the PRACH in the 4-step RA procedure, it will monitor for a Random Access Response (RAR). This is done by monitoring the physical downlink control channel (PDCCH) for a DL assignment identified by the random access-radio network temporary identifier (RA-RNTI). The RA-RNTI defines where and when the preamble was sent. It is defined in 38.321 as follows:

The RA-RNTI associated with the PRACH occasion in which the Random Access Preamble is transmitted, is computed as:

$$RA\text{-}RNTI = 1 + s\_id + 14 \times T\_id + 14 \times 80 \times f\_id + 14 \times 80 \times 8 \times ul\_carrier\_id$$

where s_id is the index of the first orthogonal frequency division multiplexing (OFDM) symbol of the PRACH occasion ($0 \le s\_id < 14$), t_id is the index of the first slot of the PRACH occasion in a system frame ($0 \le t\_id < 80$), where the subcarrier spacing to determine t_id is based on the value of p specified in clause 5.3.2 in TS 38.211, f_id is the index of the PRACH occasion in the frequency domain ($0 \le f\_id < 8$), and ul_carrier_id is the UL carrier used for Random Access Preamble transmission, 0 for normal UL (NUL) carrier, and 1 for supplementary UL (SUL) carrier.

With the 2-step procedure the random access is completed in only two steps as illustrated in FIG. 3:

Step 1: The UE sends a message A including a random access preamble together with higher layer data such as RRC connection request possibly with some small payload on PUSCH (denoted "msgA PUSCH"). The msgA PUSCH is used for small data transmissions in inactive;

Step 2: The gNB sends a response called message B, which may be described as a modified RAR, including UE identifier assignment, timing advance information, and contention resolution message etc. In addition, message B (msgB) may contain a higher layer part. Similar to a RAR, a msgB may contain responses to multiple msgAs, and thus to multiple UEs, but the optional higher layer part can only pertain to one of the responses, i.e. to one of the msgAs/UEs. If a response in a msgB does not have an associated higher layer part, this will be sent in a separate subsequent message, e.g. an RRC message, on the physical downlink shared channel (PDSCH).

The msgB is a response to msgA, which may comprise contention resolution message(s), fallback indication(s) to schedule Msg3 transmission, and backoff indication.

The msgB is a response to msgA, which may comprise responses to multiple UEs and with different kinds of information for different UEs depending on the outcome of the msgA transmission/reception, and the load on the access resources.

Upon a successful msgA reception, the gNB includes a successRAR MAC subPDU as a response for the concerned UE, where the successRAR MAC subPDU includes a contention resolution identity, a timing advance and a Cell-RNTI allocation. If the gNB successfully received the RACH preamble, but failed to receive msgA PUSCH, the gNB can respond to the concerned UE with a fallbackRAR MAC subPDU in the msgB. The fallbackRAR essentially turns the 2-step RA into a 4-step RA and consequently the fallbackRAR MAC subPDU contains an UL grant, a timing advance and a temporary Cell-RNTI (TC-RNTI) allocation, but no contention resolution identity. The UE uses the UL grant to retransmit msgA PUSCH in the form of Msg3. PDU is a protocol data unit.

When the UE transmits the selected preamble on the PRACH in the 2-step RA procedure, the UE will monitor for a Random Access Response (MsgB). This is done by monitoring the PDCCH for a DL assignment identified by a MsgB-RNTI. The MsgB-RNTI defines where and when the preamble was sent. It is defined in 38.321 as follows:

The MsgB-RNTI associated with the PRACH occasion in which the Random Access Preamble is transmitted, is computed as:

$$MsgB\text{-}RNTI = 1 + s\_id + 14 \times t\_id + 14 \times 80 \times f\_id + 14 \times 80 \times 8 \times ul\_carrier\_id + 14 \times 80 \times 8 \times 2$$

where s_id is the index of the first OFDM symbol of the PRACH occasion ($0 \le s\_id < 14$), t_id is the index of the first slot of the PRACH occasion in a system frame ($0 \le t\_id < 80$), where the subcarrier spacing to determine t_id is based on the value of p specified in clause 5.3.2 in TS 38.211, f_id is the index of the PRACH occasion in the frequency domain (0≤f_id<8), and ul_carrier_id is the UL carrier used for Random Access Preamble transmission (0 for NUL carrier, and 1 for SUL carrier).

Configuration of RACH Resources for SDT

One option for the configuration of RACH resources for SDT is to define a separate RACH, similar to what is done in legacy for contention free random access (CFRA) for beam failure recovery (BFR) or what can be done for the 2-step Random Access procedure. In this case, any UE using the separate RACH, hereafter named SDT RACH, would be doing random access for SDT. This means that the configuration here may be different, e.g. using different thresholds for preamble group B selection and the gNb could provide larger grants also in preamble group A. The preamble IDs could be reused between the two configurations, i.e. preamble 0-63 can be used both in the SDT RACH and for the legacy RACH.

SUMMARY

As part of developing embodiments here one or more problems were first identified. When separate RACH configurations are used, it may happen that one Rach occasion (RO) in one of the configurations results in the same RA-RNTI as an RO in the other RACH configuration.

This was the case also when the 2-step and 4-step random access procedures have separate configurations. In this case, this has been solved by defining a different RNTI for the 2-step response. A problem with this is that the available RNTI space is limited and defining yet another RNTI for the SDT may not be feasible. Another option is to define a new search space, but this will reduce the available resources since these resources may not be used for any other purpose, even when it is not used.

Therefore, it is necessary to study mechanisms so that a SDT UE can identify if the RAR or FallbackRAR is intended for the SDT UE or a colliding legacy UE, i.e. a UE that has chosen the same preamble and transmitted the preamble on an RO resulting in the same RA-RNTI. This will result in a more accurate use of grants and an improved performance of the wireless communication network.

An object herein is to provide a mechanism to handle communication in an efficient and reliable manner in the wireless communications network.

According to an aspect the object is achieved, according to embodiments herein, by providing a method performed by a UE for handling communication in a wireless communications network.

The UE obtains, e.g. receives or is preconfigured with, an indication of a first size of a grant for a first type of data transmission such as an SDT. The UE may for example be configured with a number of sizes for different preambles and/or different types of data transmissions. The UE then transmits an access request to a radio network node to perform data transmission of the first type of data transmission. The access request may indicate the type of data transmission such as SDT. The UE then receives a grant from the radio network node, wherein the grant indicates a size for granted data transmission, or the grant comprises an indication of type of data transmission of the granted data transmission. The UE compares the first size with the indicated size in the grant, or the first type of data transmission and indication of type of data transmission in the received grant. The UE determines, based on the comparison, whether to use the received grant for performing data transmissions or not. Thus, this configuration enables the UE to determine whether the grant is intended for the UE based on comparing the configured size with the size indicated in the grant.

According to an aspect the object is achieved, according to embodiments herein, by providing a method performed by a radio network node for handling communication in a wireless communications network. The radio network node receives from a UE, an access request to perform data transmission of a first type, and responds to the UE with a grant of a size wherein the size of the grant is based on the first type of data transmission, or the grant comprises an indication of the first type of data transmission of the granted data transmission. The radio network node may configure, e.g. transmit to, the UE with a configuration indicating that a first size of a grant is used for a first type of data transmission such as a SDT. The radio network node may configure the UE with a number of sizes for different preambles and/or different types of data transmissions. The radio network node may further, upon receiving an access request, indicating the type of data transmission such as SDT, from the UE, the radio network node may transmit the grant from the radio network node, wherein the grant may indicate the size for data transmission.

According to an aspect the object is achieved, according to embodiments herein, by providing a radio network node and UE configured to perform the methods, respectively.

Thus, it is further herein provided a UE for handling communication in a wireless communications network. The UE is configured to obtain an indication of a first size of a grant for a first type of data transmission; and to transmit an access request to a radio network node to perform data transmission of the first type of data transmission. The UE is further configured to receive a grant from the radio network node, wherein the grant indicates a size for granted data transmission, or comprises a type indication of type of data transmission of the granted data transmission. The UE is configured to compare the first size with the indicated size in the grant, or the first type of data transmission and the type of data transmission indicated by the type indication in the received grant; and based on the comparison, determine whether to use the received grant for performing data transmissions or not.

Furthermore, it is herein provided a radio network node for handling communication in a wireless communications network. The radio network node is configured to receive, from a UE, an access request to perform data transmission of a first type; and to respond to the UE with a grant of a size, wherein the size of the grant is based on the first type of data transmission, or the grant comprises a type indication of the first type of data transmission of the granted data transmission.

It is furthermore provided herein a computer program product comprising instructions, which, when executed on at least one processor, cause the at least one processor to carry out the methods above, as performed by the radio network node or UE, respectively. It is additionally provided herein a computer-readable storage medium, having stored thereon a computer program product comprising instructions which, when executed on at least one processor, cause the at least one processor to carry out the methods above, as performed by the UE or radio network node, respectively.

Embodiments herein disclose a solution that specifies grant size or sizes to be used for, for example, the SDT RACH which grant size is different to a grant size used in the legacy RACH. If the UE receives a RAR with a matching preamble, e.g. Random Access Preamble Identifier (RAPID), but where the grant size is different from what has been specified, or when the type indication of the type of data transmission of the granted data transmission does not correspond to the type indicated by the access request, the UE will not use it. In this case it may either go back to resource selection and from a preamble transmission or it will continue to monitor the PDCCH for a Random Access Response(s) identified by the RA-RNTI with a matching RAPID while the (timer related to) ra-Response Window is running. Embodiments let UEs, for example, SDT UEs, to avoid Msg3 collisions due to a legacy UE and SDT UE collision during preamble transmission resulting in same RA-RNTI. Thus, embodiments herein provide a solution resulting in an efficient and reliable communication in the wireless communications network.

BRIEF DESCRIPTION OF THE DRAWINGS

Embodiments will now be described in more detail in relation to the enclosed drawings, in which:

FIG. 5D shows a Reserved bit in successRAR according to embodiments herein;

DETAILED DESCRIPTION

Figure 1:
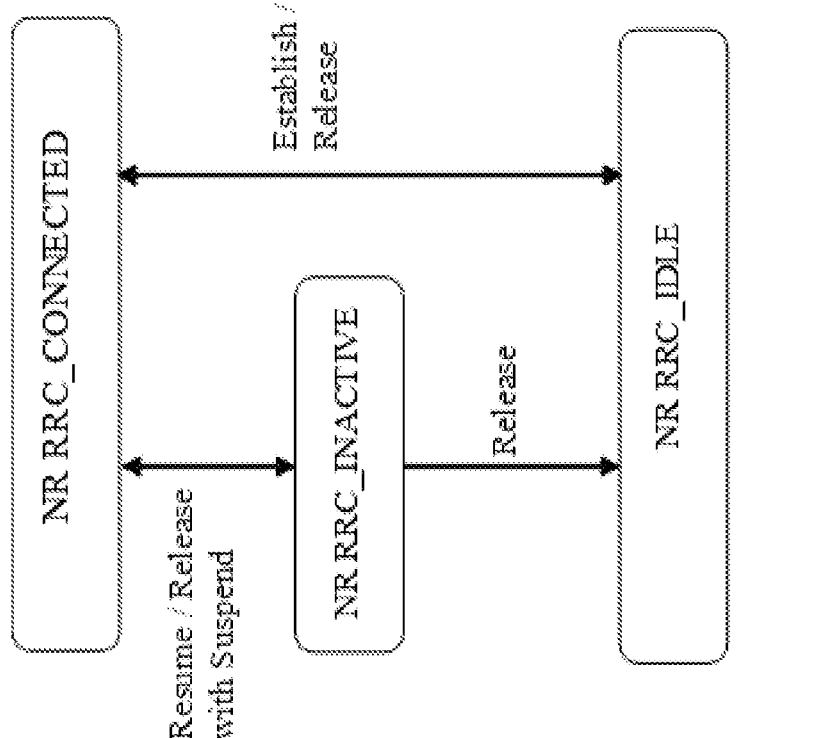
FIG. 1 illustrates state transitions according to prior art.
Figure 2:
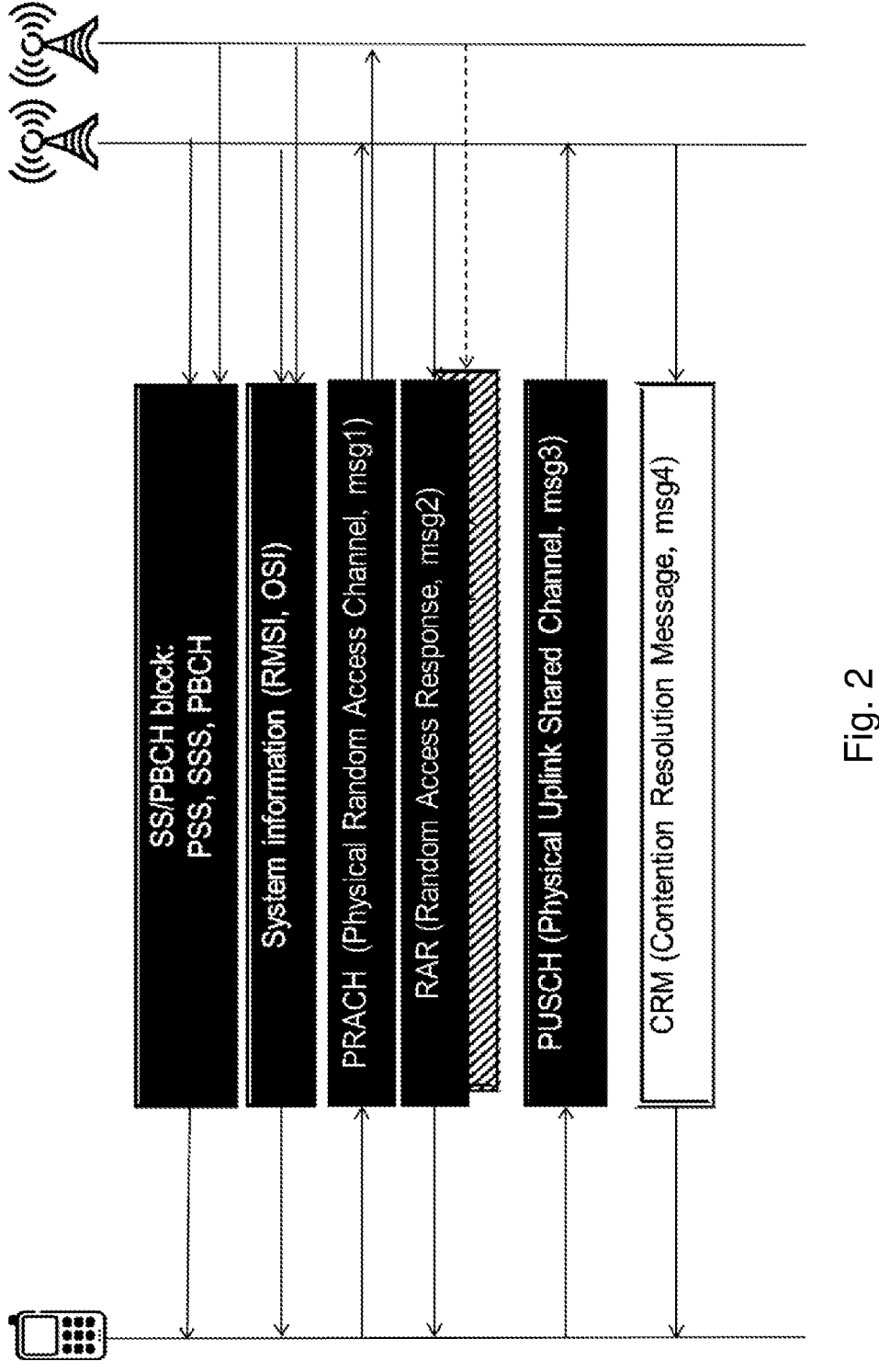
FIG. 2 illustrates a 4-step RACH process according to prior art.
Figure 3:
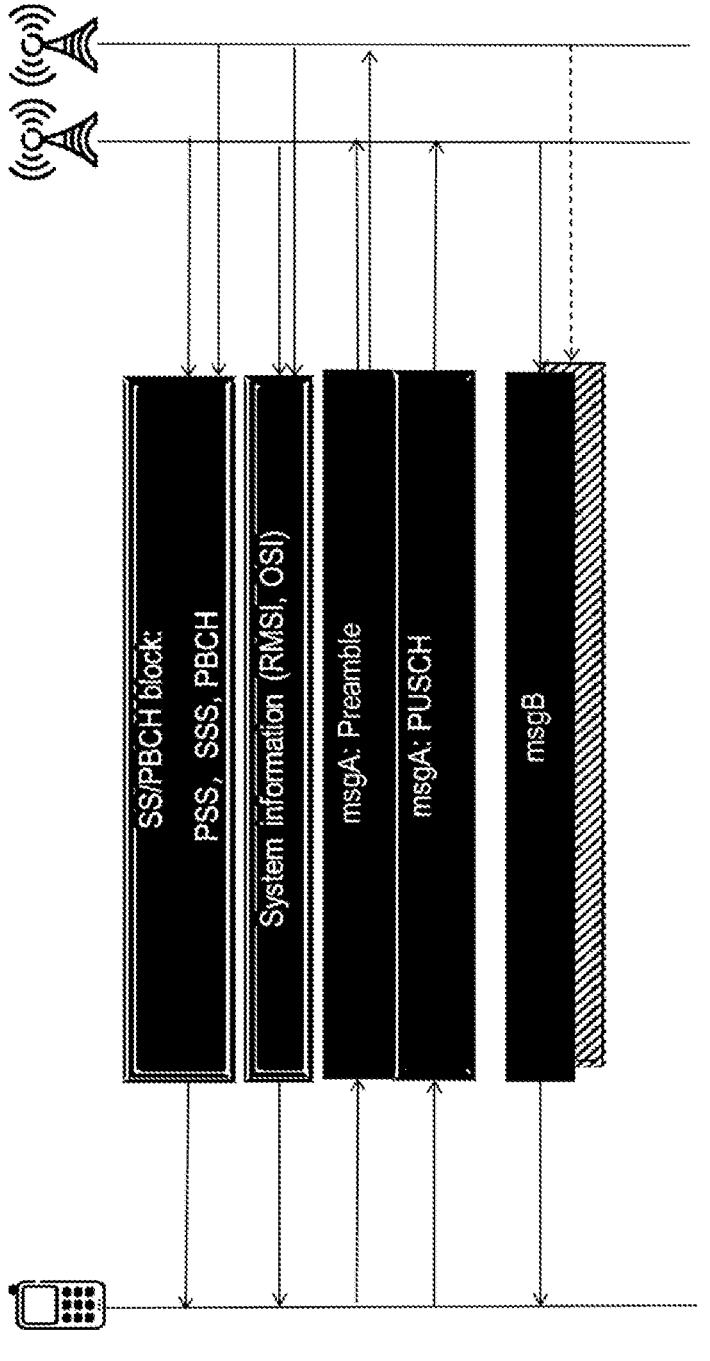
FIG. 3 illustrates a 2-step RACH process according to prior art.
Figure 4A:
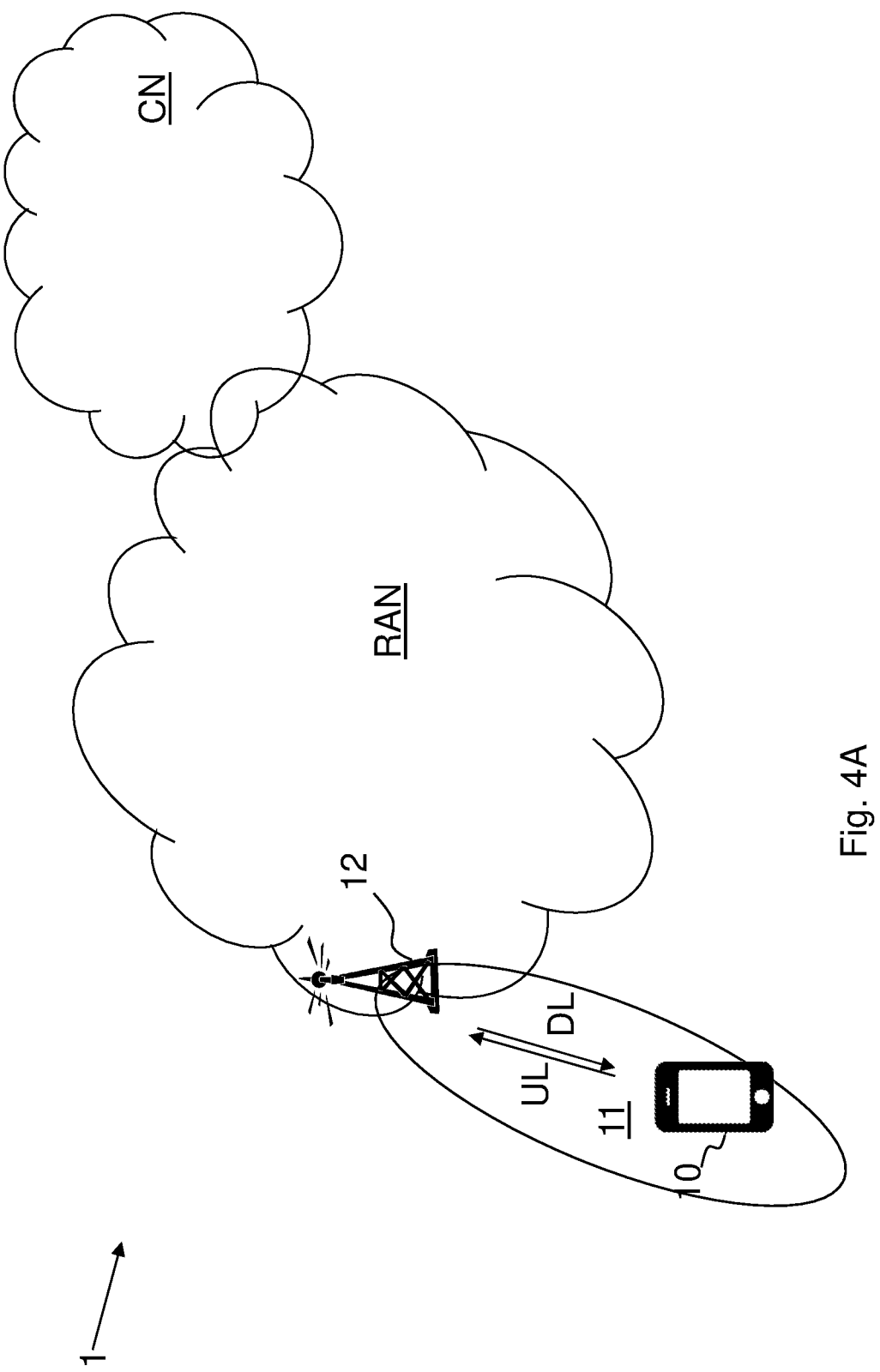
FIG. 4A shows a wireless communication network illustrating embodiments herein.

Embodiments herein relate to wireless communications networks in general. FIG. 4A is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a user equipment (UE) 10 exemplified herein as a wireless device such as a mobile station, a non-access point (non-AP) station (STA), a STA and/or a wireless terminal, is comprised communicating via e.g. one or more Access Networks (AN), e.g. radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node. The UE is in embodiments herein a small data transmission UE configured to transmit data of smaller sizes such as sensor data comprising 1-100 bits.

The wireless communications network 1 comprises a radio network node 12 providing radio coverage over a geographical area, a first service area 11 or first cell, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the radio network node depending e.g. on the first radio access technology and terminology used. The radio network node may be referred to as a serving radio network node wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage.

In the embodiments described herein the UE 10 is configured with one or more sizes of grants related to different types of data transmissions such as SDT, or other data transmissions defined by length or size of data transmissions. The UE 10 receives a grant wherein the grant indicates a size of a grant, wherein the size is based on a first type of granted data transmission, or the grant comprises an indication of a type of data transmission of the granted data transmission. The UE 10 then compares the size or the indicated type with size or type of requested data transmission. Thus, this allows the UE 10 to determine whether a received grant from the radio network node 12 is intended for the UE 10 by comparing the configured size or type with the size or type indicated by the received grant from the radio network node 12. Embodiments herein may let UEs, for example, SDT UEs, to avoid Msg3 collisions due to a legacy UE and SDT UE collision during preamble transmission resulting in a same RA-RNTI.

Figure 4B:
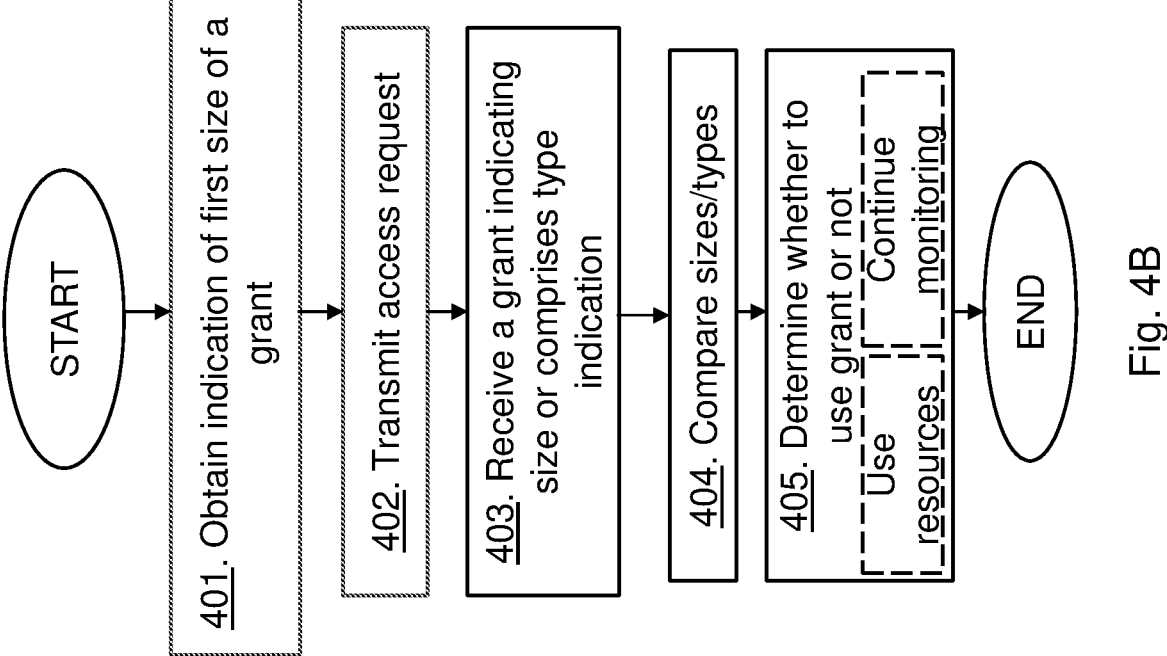
FIG. 4B shows a flowchart depicting a method performed by a UE according to embodiments herein.

The method actions performed by the UE 10 for handling communication in the wireless communications network according to embodiments will now be described with reference to a flowchart depicted in FIG. 4B. The actions do not have to be taken in the order stated below, but may be taken in any suitable order. Dashed boxes indicate optional features.

Action 401. The UE obtains an indication of a first size of a grant for a first type of data transmission such size of a SDT communication. The UE may for example be configured with a number of sizes for different preambles and/or different types of data transmissions, such as SDT, legacy transmission, EDT or similar.

Action 402. The UE 10 transmits an access request to the radio network node 12 to perform data transmission of the first type of data transmission. The access request may indicate the type of data transmission such as SDT.

Action 403. The UE 10 receives a grant from the radio network node 12, wherein the grant indicates a size for granted data transmission, or comprises a type indication of type of data transmission of the granted data transmission. The grant may be received in a RAR. For example, the UE 10 may receive a response such as a RAR with a grant indicating a size of the granted data transmission.

Action 404. The UE 10 further compares the first size with the indicated size in the grant, or the first type of data transmission and type indication of type of data transmission in the received grant. Thus, the UE 10 may compare the configured size with the indicated size in the grant.

Action 405. The UE 10 then, based on the comparison, determines whether to use the received grant for performing data transmissions or not. For example, if the size in the received grant matches the size as configured at the UE, the UE 10 may use resources to perform data transmission. Thus, the UE may use resources to perform data transmission if the size in the received grant matches the first size, or the first type of data transmission matches the type of data transmission indicated by the type indication in the received grant. However, if the sizes does not match, for example, the size in the received grant is larger than configured size the UE 10 may continue monitoring for a response over a time interval. Thus, the UE 10 may go back to resource selection or continue monitoring for a response over the time interval if the size in the received grant does not match the first size, or the first type of data transmission does not match the type of data transmission indicated by the type indication in the received grant. Thus, as stated above, the UE 10 may receive the grant and the type indication in the grant indicates type of data transmission associated with the grant. The UE 10 may then determine whether the grant is intended for the UE based on the received type indication.

Some embodiments disclose examples of UE actions when received grant matches the configured grant size in 4-step RA case, when a Random Access procedure has been initiated for SDT and grant sizes for msg3 have been configured and if a valid (as specified in TS 38.213 v.16.0.0) downlink assignment has been received on the PDCCH for the RA-RNTI and the received transmission block (TB) is successfully decoded and the Random Access Response contains a MAC subPDU with Random Access Preamble identifier corresponding to the transmitted PREAMBLE_INDEX, and The grant size in the received RAR matches the configured grant size The UE 10 may then conclude that the received RAR is a SDT RAR and may continue to transmit Msg3 on the received grant consisting of multiplexed CCCH and data.

Note. That the grant size in the received RAR matches the configured grant size means either that they are of equal size or that the grant in the RAR is larger than the configured grant size. In an example 4-step RA procedure (Same as above but in spec language for TS 38.321 v.16.0.0) the UE 10 may evaluate the reception as to the above as:

Once the Random Access Preamble for SDT is transmitted the MAC entity shall:

1> start the Random Access response window timer configured at the first PDCCH occasion from the end of the Random Access Preamble transmission, 1> monitor the PDCCH of the SpCell for Random Access Response(s) identified by the RA-RNTI while the Random Access response window timer is running, 1> if the Random Access Response contains a MAC subPDU with Random Access Preamble identifier corresponding to the transmitted preamble index and;

1> if an uplink grant provided in the Random Access Response for the same group of contention-based Random Access Preambles is equal or greater than ra-Msg3GrantSizeGroupX:

2> consider this Random Access Response reception successful;

2> process the received UL grant value and indicate it to the lower layers.

As embodiments concerning the 2-step RA procedure, i.e., UE actions when received grant in FallbackRAR matches the transmitted size of MsgA payload. In this case the UE 10 checks whether the size of the grant in the FallbackRAR matches the size of the MsgA payload. If this check is successful, the Random Access Response is considered successful and the UE 10 utilizes the grant. That is, when a 2-step Random Access procedure has been initiated for SDT and if a valid (as specified in TS 38.213) downlink assignment has been received on the PDCCH for the MsgB-RNTI and the received TB is successfully decoded, and the Random Access Preamble identifier in the MAC subPDU matches the transmitted PREAMBLE_INDEX, the MsgB contains a fallbackRAR MAC subPDU, and the uplink grant provided in the FallbackRAR matches the size of the MsgA payload;

then the UE 10 may consider this Random Access Response reception successful and utilize the grant for a Msg3 transmission.

This embodiment may, if implemented in the standard, lead to the below change in 38.321 (underlined and bold)

Once the MsgA preamble is transmitted, regardless of the possible occurrence of a measurement gap, the MAC entity shall:

1> start the Random Access response window timer configured at the PDCCH occasion as specified;

1> monitor the PDCCH of the SpCell for a Random Access Response identified by MSGB-RNTI while the Random Access response window timer is running;

1> if notification of a reception of a PDCCH transmission of the SpCell is received from lower layers:

1> if a valid (as specified in TS 38.213 [6]) downlink assignment has been received on the PDCCH for the MSGB-RNTI and the received TB is successfully decoded:

1> if the Random Access Preamble identifier in the MAC subPDU matches the transmitted PREAMBLE_INDEX;

3> if the MSGB contains a fallbackRAR MAC subPDU; and

3> if the Random Access Preamble identifier in the MAC subPDU matches the transmitted PREAMBLE_INDEX (see clause 5.1.3a) and;

3> and the uplink grant provided in the FallbackRAR matches the size of the MsgA payload 4> consider this Random Access Response reception successful.

It is herein further disclosed UE actions when received grant does not match the configure grant size in 4-step RA case, when a Random Access procedure has been initiated for SDT and grant sizes for msg3 have been configured and if a valid (as specified in TS 38.213) downlink assignment has been received on the PDCCH for the RA-RNTI and the received TB is successfully decoded and the Random Access Response contains a MAC subPDU with Random Access Preamble identifier corresponding to the transmitted PREAMBLE_INDEX, and The grant size in the received RAR does not match the configured grant size Then the UE 10 may either A. Continue to monitor the PDCCH for Random Access Response(s) identified by the RA-RNTI while the ra-Response Window is running, or B. Return to Random Access Resource selection by at least the following steps:

consider the Random Access Response reception not successful;

increment PREAMBLE_TRANSMISSION_COUNTER by 1;

if PREAMBLE_TRANSMISSION_ COUNTER=preambleTransMax+1:

indicate a Random Access problem to upper layers;

else:

perform the Random Access Resource selection procedure

Whether to select (A) or (B) may be hard-coded in the specification or be configurable at the UE 10.

Note. That the grant size in the received RAR does not match the configured grant size means either that they are of different size or that the grant in the RAR is smaller than the configured grant size.

Embodiments herein may also relate to the 2-step RA procedure for SDT. For example, UE actions when received grant in the FallbackRAR does not match the MsgA payload, when a 2-step Random Access procedure has been initiated for SDT and if a valid (as specified in TS 38.213) downlink assignment has been received on the PDCCH for the MSGB-RNTI and the received TB is successfully decoded, and the Random Access Preamble identifier in the MAC subPDU matches the transmitted PREAMBLE_IN-DEX, and the MSGB contains a fallbackRAR MAC subPDU, and the uplink grant provided in the FallbackRAR does not match the size of the MsgA payload Then the UE 10 may either C. continue monitor the PDCCH of the SpCell for a Random Access Response identified by MSGB-RNTI while the msgB-Response Window is running; or D. Return to Random Access Resource selection by at least the following steps:

consider the Random Access Response reception not successful;

increment PREAMBLE_TRANSMISSION_COUNTER by 1;

if PREAMBLE_TRANSMISSION_ COUNTER=preambleTransMax+1:

indicate a Random Access problem to upper layers;

else:

perform the Random Access Resource selection procedure

In some embodiments, in either 2-step or 4-step RACH, instead of comparing the provided grant size based on the configuration, the radio network node 12 provides the type indication to the UE in RAR (4-step RA) or successRAR or fallbackRAR whether the provided grants corresponds to SDT or legacy, being an example as disclosed in action 403. Based on the type indication:

If the grant corresponds to the reason the UE 10 initiated the RA (i.e. SDT), the UE 10 considers the Random Access Response reception successful.

If the grant does not correspond to the reason why the UE 10 initiated the RA, the UE 10 considers the Random Access Response reception not successful.

In an example the type indication is provided through 'R' bit in the MAC subheader in the RAR, or in case of 'successRAR' or "FallbackRAR" in the 2-step RA procedure through one of the 'R' bits in the corresponding MAC subheader—e.g. setting an 'R' bit to one in these cases would indicate to the UE 10 if the response corresponds to, or is for, a SDT UE or a legacy UE.

The UE 10 may consider the condition whether the Random Access Reception is successful or not through a combination of the type indication and any other embodiments.

It should further be noted that the transmission power of Msg3 for the SDT UEs may be configured higher than for legacy UEs. This will increase the chance of the SDT Msg3 to be received compared to the Msg3 transmission of the legacy UEs in case they transmit on the same grant.

Figure 4C:
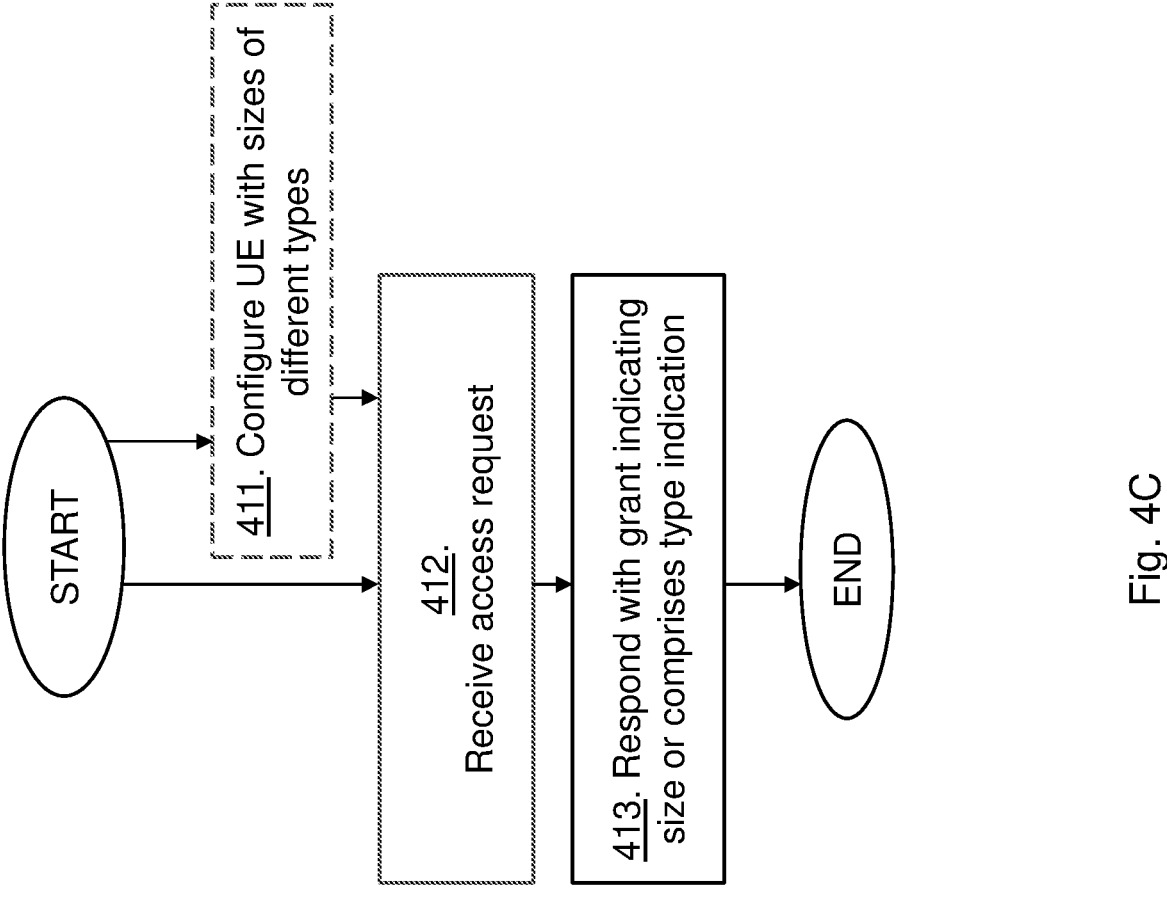
FIG. 4C shows a flowchart depicting a method performed by a radio network node according to embodiments herein.

The method actions performed by the radio network node 12 for handling communication in the wireless communications network according to embodiments will now be described with reference to a flowchart depicted in FIG. 4C. The actions do not have to be taken in the order stated below but may be taken in any suitable order. Dashed boxes indicate optional features.

Action 411. The radio network node 12 may configure the UE 10 with the first size of grants for the data transmission of the first type such as SDT. The radio network node 12 may configure the UE with a number of sizes for different preambles and/or different types of data transmissions, such as SDT, legacy transmission, EDT or similar. This size may be referred to as threshold size. In an embodiment, the grant sizes for msg3 in the preamble groups for SDT are configured with a configuration. This can be done by defining new parameters in, e.g., the RRC information element (IE) RACH Config Common. For example, as ra-Msg3GrantSizeGroupA ENUMERATED {b56, b144, b208, b256, b282, b480, b640, b800, b1000, b72, spare6, spare5, spare4, spare3, spare2, spare1}, ra-Msg3GrantSizeGroupB ENUMERATED {b56, b144, b208, b256, b282, b480, b640, b800, b1000, b72, spare6, spare5, spare4, spare3, spare2, spare1}

The meaning of these parameters may be

1. The size of the grant that the radio network node 12 will provide in the RAR for the different preamble groups 2. The minimum size of the grant that the radio network node 12 will provide in the RAR for the different preamble groups.

The parameters may be included in system information (SI) of the cell where the SDT takes place or be provided to the UE 10 via dedicated RRC signaling and saved in the UE context when the UE 10 transits to RRC inactive mode. In the latter case, the parameters may or may not be valid only if the SDT takes place in the same serving cell as the cell where the UE 10 went to RRC inactive mode. If the parameters would be valid in case UE 10 initiates a connection resumption procedure in another cell where the configuration is initially provided, the possible new cell gets the configuration from the previous Serving cell through signaling between the said cells, e.g., over an Xn interface between two gNBs.

Action 412. The radio network node 12 receives from the UE 10 the access request to perform data transmission of the first type, such as SDT.

Action 413. The radio network node 12 then responds to the UE 10 with the grant of a size wherein the size of the grant is based on, or taking into account, the first type of data transmission. Alternatively, the radio network node 12 responds with, or transmits, the grant and the type indication of the first type of data transmission of the granted data transmission. For example, the radio network node 12 may transmit the type indication in the grant indicating type of data transmission associated with the grant.

Figure 5A:
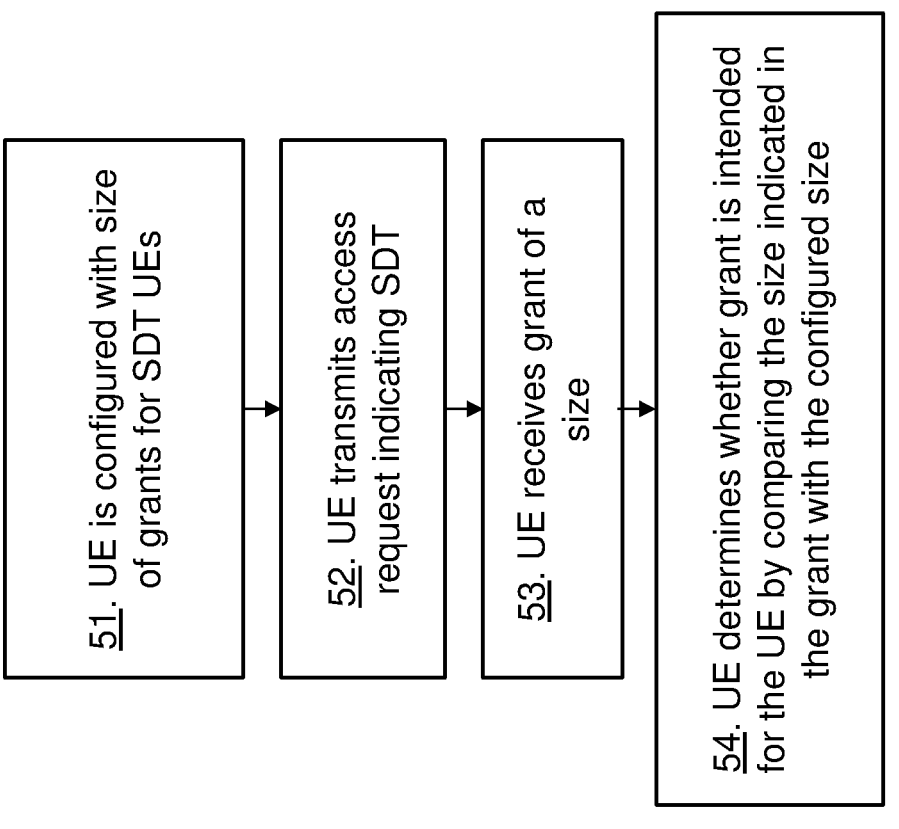
FIG. 5A shows a flowchart depicting a method performed by a UE according to some embodiments herein.

FIG. 5A shows a sequence chart for some embodiments. Note also that action 51 may be implicit, e.g. based on specified rules, which may be hardcoded or permanently implemented into the UE 10, for to determine whether a received grant is intended for the UE or not.

In action 51 the UE 10 is configured with sizes of different grants respectively associated with different types of data transmissions such as SDT, EDT or similar.

In action 52, the UE 10 transmits an access request such as a RA request wherein the access request indicates type of data transmission such as SDT.

In action 53, the UE 10 receives the grant from the radio network node 12 with the grant size for data transmission. For example, the UE 10 may receive a RAR with Random Access Preamble identifier corresponding to a transmitted PREAMBLE_INDEX, and comprising the grant size.

In action 54 the UE 10 may further determine whether the grant is intended for the UE 10 by comparing the size configured at the UE 10 with the grant size. In case there is a match the UE 10 uses the grant otherwise the UE 10 may continue monitoring the control channel. Alternatively, the UE 10 may receive the grant and the type indication in the grant indicating type of data transmission associated with the grant. The UE 10 may then determine whether the grant is intended for the UE based on the received type indication.

The reserved 'R' bit in the RAR may be used to indicate that the RAR is associated to a configured SDT PRACH. That is, a UE which has transmitted a preamble in SDT PRACH will ignore any RAR in which the 'R' bit is not set to value 1. In legacy operation the 'R' bit is expected to be set to 0, and legacy UEs should ignore RAR for which this is not the case. This applies to MAC RAR for 4-step RACH and fallbackRAR or successRAR for 2-step RACH. Thus, the radio network node 12 may transmits the type indication to the UE 10 whether the RAR is intended for the UE either by using the reserved bit or by indicating a grant size related to the data transmission of the UE 10.

Figure 5C:
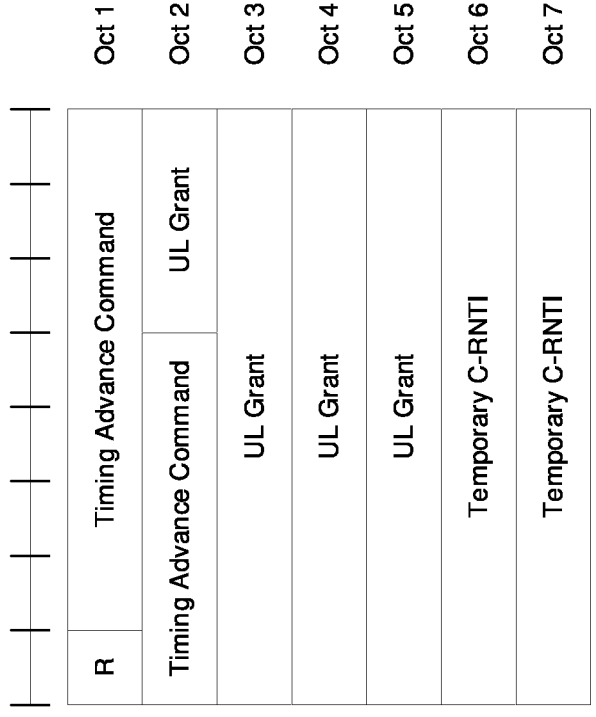
FIG. 5C shows a Reserved bit in fallbackRAR according to embodiments herein.
Figure 5B:
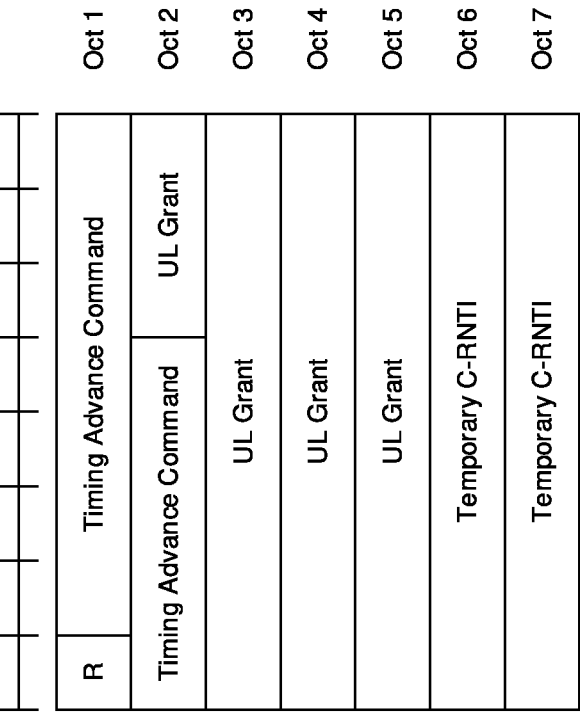
FIG. 5B shows a Reserved bit in MAC RAR according to embodiments herein.
Figure 5F:
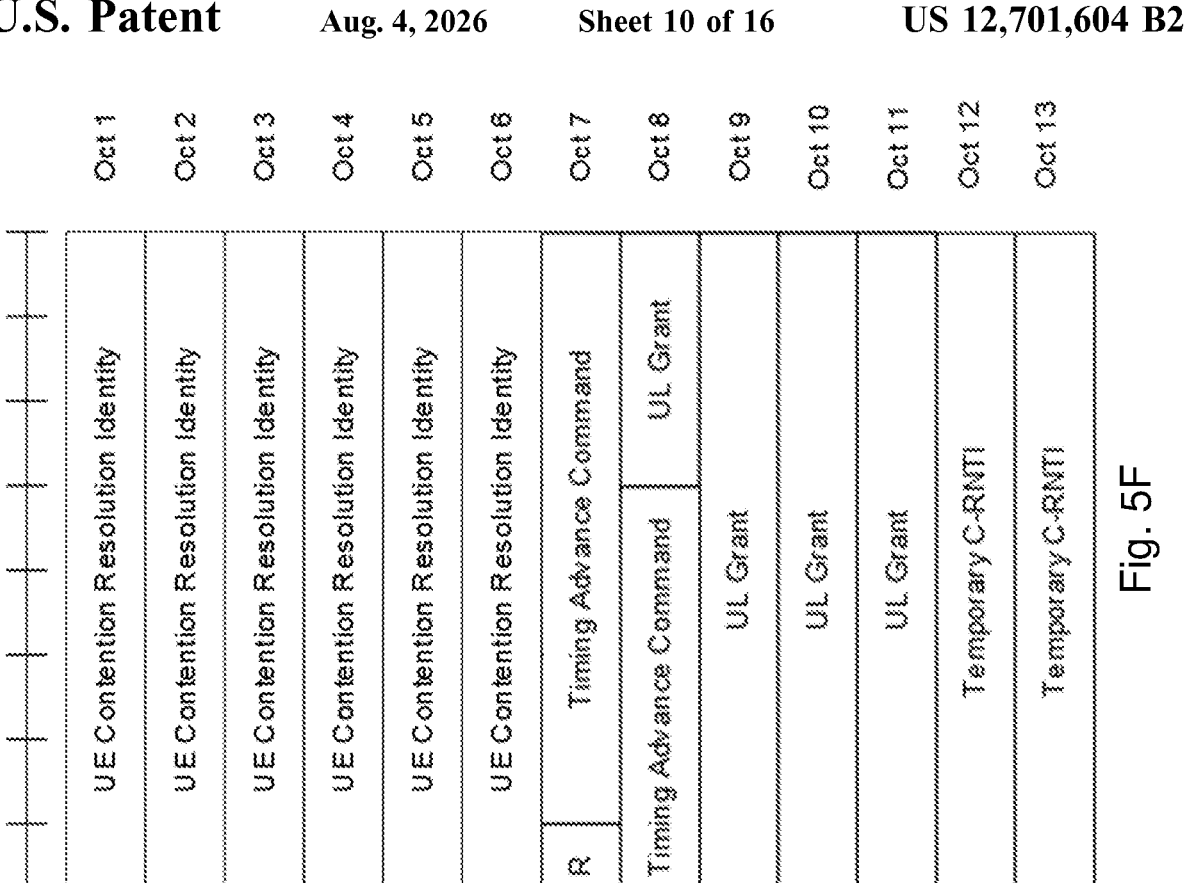
FIG. 5F shows a fallbackRAR according to embodiments herein.
Figure 5E:
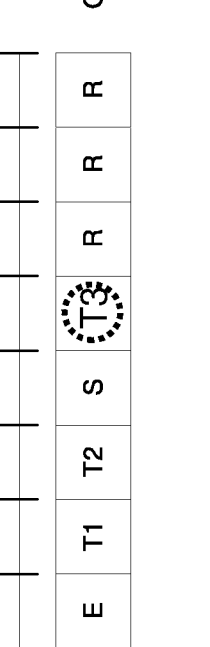
FIG. 5E shows a fallbackRAR according to embodiments herein.

FIG. 5B shows a Reserved bit in MAC RAR
FIG. 5C shows a Reserved bit in fallbackRAR
FIG. 5D shows a Reserved bit in successRAR In another embodiment, for SDT a modified version of the existing successRAR MAC header is used. That is, the first reserved bit in the MAC subheader indicates whether the MAC subPDU is for legacy 2-step RACH ('R' bit=0) or for SDT RACH ('R' bit=1). The reserved bit would then not be a reserved bit anymore but called something else, e.g. T3, shown in FIG. 5E in an SDT fallbackRAR.

In this case, the SDT successRAR could keep the same format, but for fallbackRAR a new format would have to be introduced to include the RAPID. E.g. the following shown in FIG. 5F.

In another embodiment, the configuration of SDT PRACH is restricted in time and frequency to ensure RAR-RNTIs (or MSGB-RNTIs) between legacy and SDT does not overlap. That is, either in NW implementation or in specification the SDT PRACH can only be configured in time and frequency such that the RAR-RNTI (or MSGB-RNTI) for SDT will not give the same number as for legacy RAR-RNTI (or MSGB-RNTI).

Figure 6:
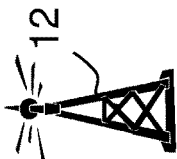
FIG. 6 shows a block diagram depicting UEs according to embodiments herein.
Figure 6:
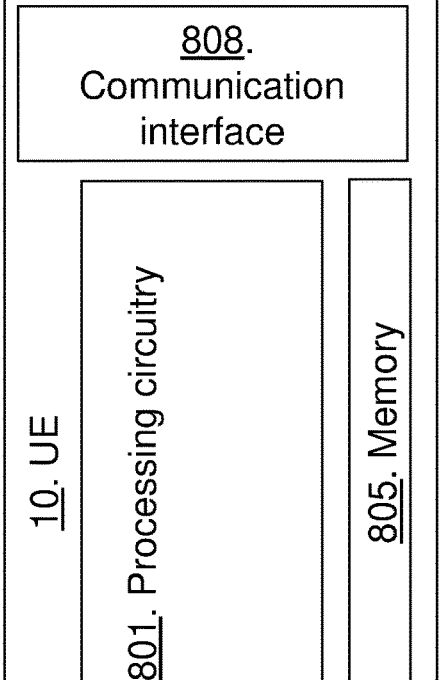
Figure 6:
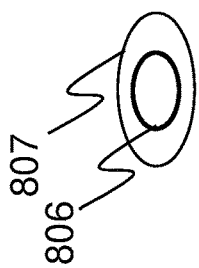

FIG. 6 is a block diagram depicting the UE 10 for handling communication in the wireless communications network 1 according to embodiments herein.

The UE 10 may comprise processing circuitry 801, e.g. one or more processors, configured to perform the methods herein.

The UE 10 may comprise an obtaining unit 802, e.g. a reader, a receiver or a transceiver. The UE 10, the processing circuitry 801 and/or the obtaining unit 802 is configured to obtain the indication of the first size of the grant for the first type of data transmission. Thus, the UE 10, the processing circuitry 801 and/or the obtaining unit 802 may be configured to obtain the indication of the first size indicated by a grant for the first type of data transmission such as an SDT. This size may be referred to as threshold size. The UE 10, the processing circuitry 801 and/or the obtaining unit 802 may be configured to obtain the indication of the first size by being configured with a number of sizes for different preambles and/or different types of data transmissions. Thus, the indication of the first size may be obtained by the UE by being configured with a number of sizes for different preambles and/or different types of data transmissions.

The UE 10 may comprise a transmitting unit 803, e.g. a transmitter or a transceiver. The UE 10, the processing circuitry 801 and/or the transmitting unit 803 is configured to transmit the access request to the radio network node 12 to perform data transmission of the first type of data transmission. Thus, the UE 10, the processing circuitry 801 and/or the transmitting unit 803 may be configured to transmit, to the radio network node 12, the access request indicating the type of data transmission such as SDT.

Furthermore, the UE 10, the processing circuitry 801 and/or the obtaining unit 802 is configured to receive the grant from the radio network node 12, wherein the grant indicates the size for granted data transmission, or comprises the type indication of type of data transmission of the granted data transmission. Thus, the UE 10, the processing circuitry 801 and/or the obtaining unit 802 may be configured to receive from the radio network node 12, the grant with a size for data transmission. The grant may be received in a random access response. For example, the UE 10, the processing circuitry 801 and/or the obtaining unit 802 may be configured to receive a response such as a RAR with a grant indicating a size of granted data transmission.

The UE 10 may comprise a determining unit 804. The UE 10, the processing circuitry 801, and/or the determining unit 804 is configured to compare the first size with the indicated size in the grant, or the first type of data transmission and the type of data transmission indicated by the type indication in the received grant; and based on the comparison, determine whether to use the received grant for performing data transmissions or not. Thus, the UE 10, the processing circuitry 801 and/or the determining 804 may be configured to determine whether to use the grant for performing data transmissions or not by comparing the size of the received grant and the configured size. Alternatively, the UE 10, the processing circuitry 801 and/or the obtaining unit 802 may be configured to receive from the radio network node 12 the grant and the type indication in the grant indicating type of data transmission associated with the grant. The UE 10, the processing circuitry 801 and/or the determining 804 may be configured to determine whether the grant is intended for the UE based on the received type indication. The UE 10, the processing circuitry 801 and/or the determining 804 may be configured to, if the size in the received grant matches the first size, or the first type of data transmission matches the type of data transmission indicated by the type indication in the received grant, use resources to perform data transmission. The UE 10, the processing circuitry 801 and/or the determining 804 may be configured to, if the size in the received grant does not match the first size, or the first type of data transmission matches the type of data transmission indicated by the type indication in the received grant, continue monitoring for a response over a time interval, or to go back to resource selection.

The UE 10 may comprise a memory 805. The memory 805 comprises one or more units to be used to store data on, such as data packets, grants, sizes, indications, mobility events, measurements, events and applications to perform the methods disclosed herein when being executed, and similar. Furthermore, the UE 10 may comprise a communication interface 808 such as comprising a transmitter, a receiver, a transceiver and/or one or more antennas.

The methods according to the embodiments described herein for the UE 10 are respectively implemented by means of e.g. a computer program product 806 or a computer program, comprising instructions, i.e., software code portions, which, when executed on at least one processor, cause the at least one processor to carry out the actions described herein, as performed by the UE 10. The computer program product 806 may be stored on a computer-readable storage medium 807, e.g. a disc, a universal serial bus (USB) stick or similar. The computer-readable storage medium 807, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE 10 for handling communication in a wireless communications network, wherein the UE 10 comprises processing circuitry and a memory, said memory comprising instructions executable by said processing circuitry whereby said UE 10 is operative to perform any of the methods herein.

Figure 7:
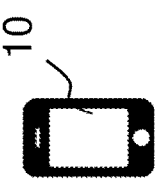
FIG. 7 shows a block diagram depicting radio network nodes according to embodiments herein.
Figure 7:
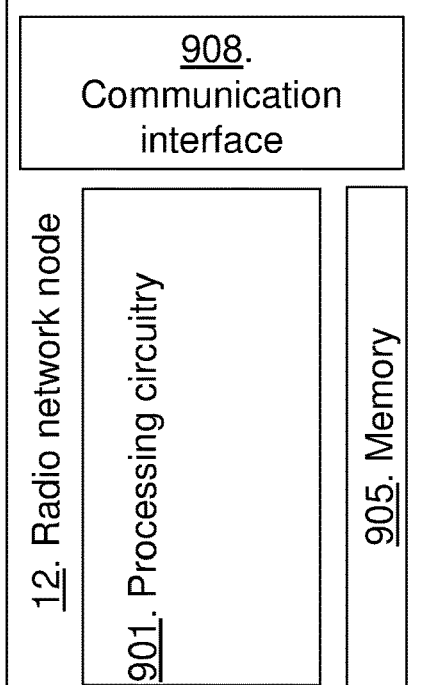
Figure 7:
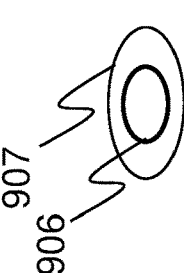

FIG. 7 is a block diagram depicting the radio network node 12 for handling communication in the wireless communications network 1 according to embodiments herein.

The radio network node may 12 comprise processing circuitry 901, e.g. one or more processors, configured to perform the methods herein.

The radio network node may 12 comprise a configuring unit 902, e.g. a transmitter or a transceiver. The radio network node 12, the processing circuitry 901 and/or the configuring unit 902 may be configured to configure the UE 10 with the first size of grants for a data transmission of the first type. For example, the radio network node 12, the processing circuitry 901 and/or the configuring unit 902 may be configured to configure the UE with the indication indicating size of grant for data transmissions of the first type such as SDT. The radio network node 12, the processing circuitry 901 and/or the configuring unit 902 may be configured to configure the UE 10 with the first size by configuring the UE 10 with a number of sizes for different preambles and/or different types of data transmissions.

The radio network node 12 may comprise a receiving unit 903, e.g. a receiver or a transceiver. The radio network node 12, the processing circuitry 901 and/or the receiving unit 903 is configured receive from the UE 10, the access request to perform data transmission of a first type, for example, an access request indicating data transmission type from the UE 10.

The radio network node 12 may comprise a transmitting unit 904, e.g. a transmitter or a transceiver. The radio network node 12, the processing circuitry 901 and/or the transmitting unit 904 is configured respond to the UE 10 with the grant of a size, wherein the size of the grant is based on the first type of data transmission, or the grant comprises a type indication of the first type of data transmission of the granted data transmission. Thus, the radio network node 12, the processing circuitry 901 and/or the transmitting unit 904 may be configured transmit the grant with a size for data transmission. For example, the radio network node 12, the processing circuitry 801 and/or the transmitting unit 904 may be configured to transmit the response such as a RAR with a grant indicating a size of granted data transmission. The response may comprise a grant size over one or more octets. Alternatively, the radio network node 12, the processing circuitry 901 and/or the transmitting unit 904 may be configured transmit the grant and the type indication in the grant indicating type of data transmission associated with the grant.

The radio network node 12 may comprise a memory 905. The memory 905 comprises one or more units to be used to store data on, such as data packets, mobility events, measurements, sizes related to types of data transmissions, events and applications to perform the methods disclosed herein when being executed, and similar. Furthermore, the radio network node may comprise a communication interface 908 such as comprising a transmitter, a receiver, a transceiver and/or one or more antennas.

The methods according to the embodiments described herein for the radio network node 12 are respectively implemented by means of e.g. a computer program product 906 or a computer program, comprising instructions, i.e., software code portions, which, when executed on at least one processor, cause the at least one processor to carry out the actions described herein, as performed by the radio network node 12. The computer program product 906 may be stored on a computer-readable storage medium 907, e.g. a disc, a universal serial bus (USB) stick or similar. The computer-readable storage medium 907, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, embodiments herein may disclose a radio network node 12 for handling communication in a wireless communications network, wherein the radio network node 12 comprises processing circuitry and a memory, said memory comprising instructions executable by said processing circuitry whereby said radio network node 12 is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, gNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 8:
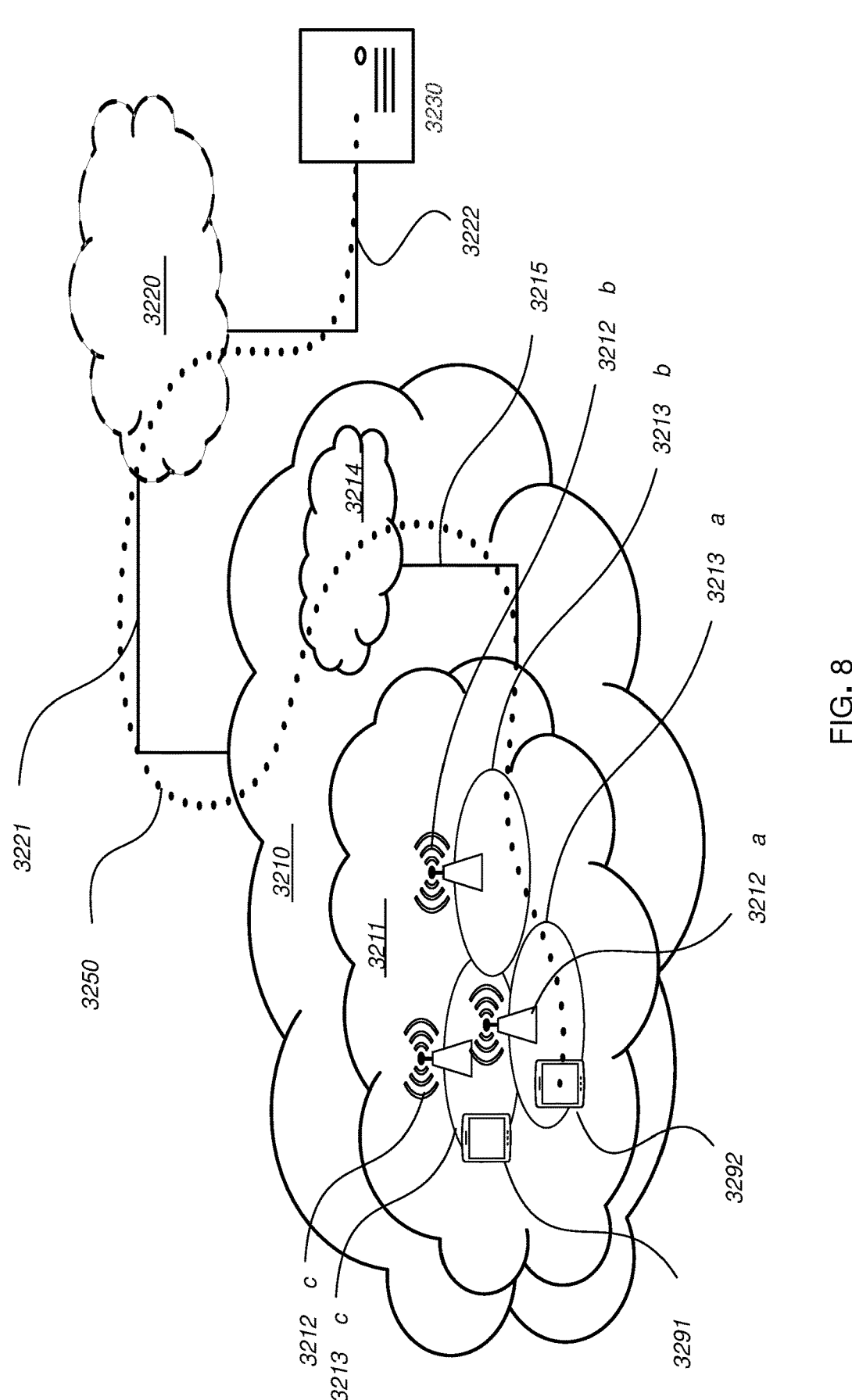
FIG. 8 schematically illustrates a telecommunication network connected via an intermediate network to a host computer.

With reference to FIG. 8, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10 and relay UE 13, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
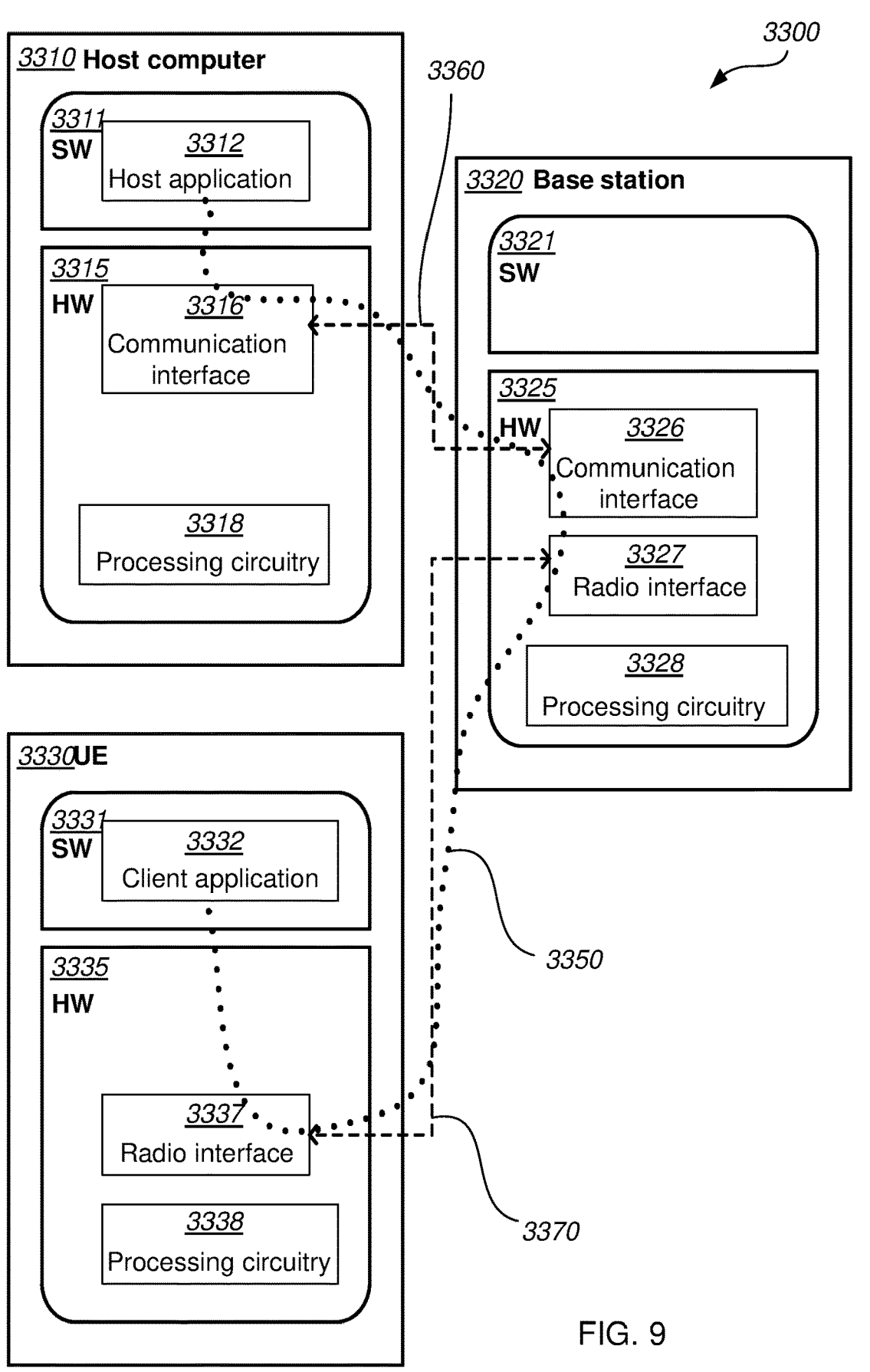
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212*a*, 3212*b*, 3212*c* and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since grants are handled more accurate and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 10, 11:
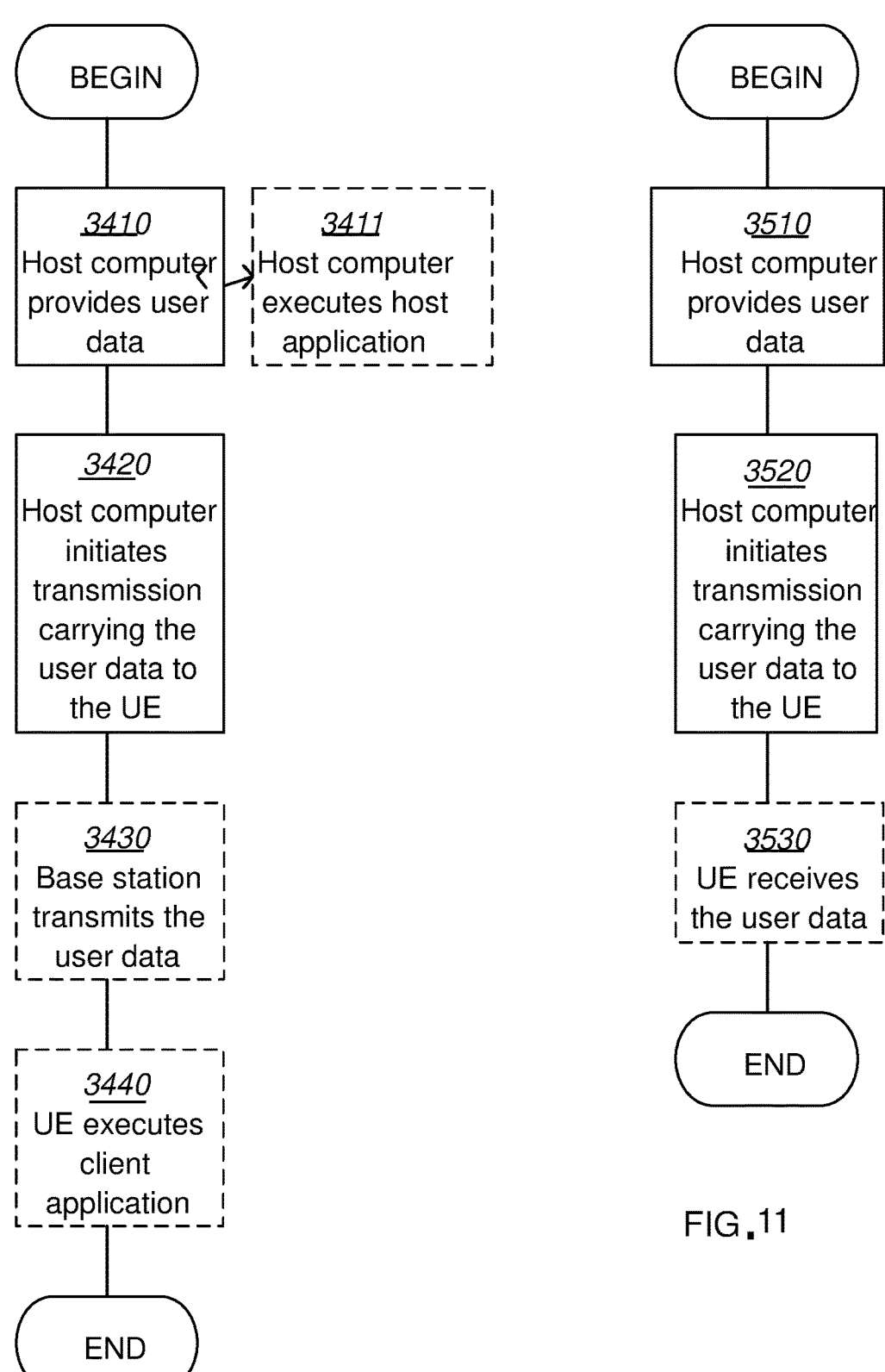
FIGS. 10-13 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 12, 13:
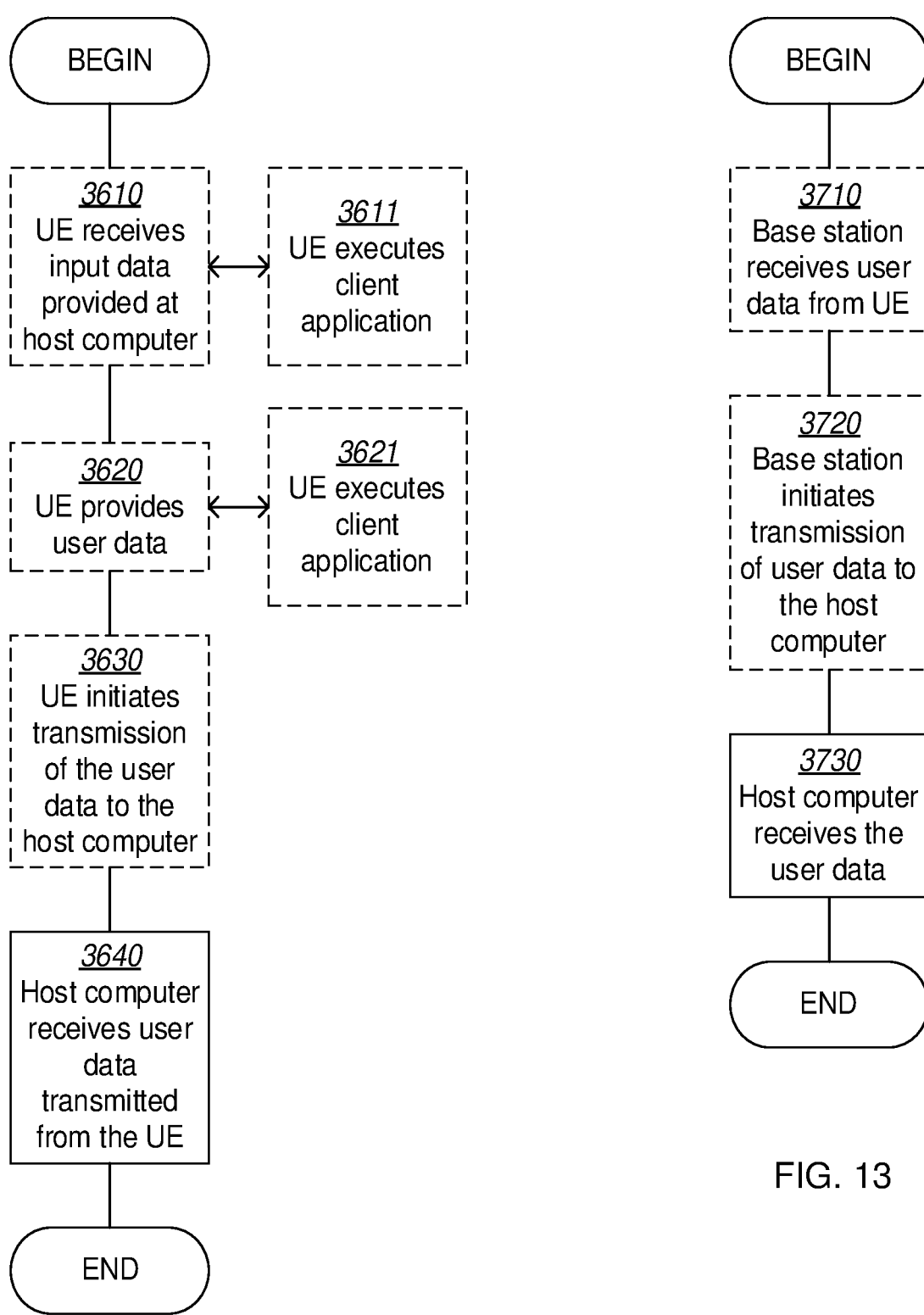

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

| Abbreviation | Explanation |
| --- | --- |
| 5GC | 5th Generation Core Network |
| BSR | Buffer Status Report |
| CORESET | Control Resource Set |
| CN | Core Network |
| CSS | Common Search Space |
| DCI | Downlink Control Indicator |
| DVT | Data Volume Threshold |
| EDT | Early Data Transmission |
| MIB | Master Information Block |
| Msg | Message |
| NR | New Radio |
| PBCH | Physical Broadcast Channel |
| PDCCH | Physical Downlink Control Channel |
| PDSCH | Physical Downlink Shared Channel |
| PRACH | Physical Random Access Channel |
| RACH | Random Access Channel |
| RAR | Random Access Response |
| SDT | Small Data Transmission |
| SSB | Synchronization Signal Block |

The invention claimed is:

1. A method performed by a user equipment (UE) for handling communication in a wireless communications network, the method comprising:

obtaining an indication of a first size of a grant for a first type of data transmission;

transmitting an access request to a radio network node to perform data transmission of the first type of data transmission, wherein the access request comprises an indication indicating the first type of data transmission;

receiving a grant from the radio network node, wherein the grant indicates a size for granted data transmission, or comprises a type indication of type of data transmission of the granted data transmission;

comparing the first size with the indicated size in the grant, or the first type of data transmission and the type of data transmission indicated by the type indication in the received grant; and based on the comparison, determining whether to use the received grant for performing data transmissions or not, wherein the first type of data transmission is small data transmission (SDT) or Early Data transmission (EDT).

2. The method according to claim 1, wherein the indication of the first size is obtained by the UE by being configured with a number of sizes for different preambles and/or different types of data transmissions.

3. The method according to claim 1, wherein the grant is received in a random access response.

4. The method according to claim 1, wherein determining whether to use the grant for performing data transmissions or not comprises, if the size in the received grant matches the first size, or the first type of data transmission matches the type of data transmission indicated by the type indication in the received grant, using resources to perform data transmission.

5. The method according to claim 1, wherein determining whether to use the grant for performing data transmissions or not comprises, if the size in the received grant does not match the first size, or the first type of data transmission does not match the type of data transmission indicated by the type indication in the received grant, continue monitoring for a response over a time interval, or going back to resource selection.

6. A method performed by a radio network node for handling communication in a wireless communications network, the method comprising:

receiving from a user equipment (UE) an access request to perform data transmission of a first type; and responding to the UE with a grant of a size, wherein the size of the grant is based on the first type of data transmission, or the grant comprises a type indication of the first type of data transmission of a granted data transmission, wherein the access request comprises an indication indicating the first type of data transmission, wherein the first type of data transmission is small data transmission (SDT) or Early Data transmission (EDT).

7. The method according to claim 6, further comprising configuring the UE with a first size of grants for a data transmission of the first type.

8. The method according to claim 7, wherein configuring the UE with the first size comprises configuring the UE with a number of sizes for different preambles and/or different types of data transmissions.

9. A user equipment (UE) for handling communication in a wireless communications network, wherein the UE is configured to:

obtain an indication of a first size of a grant for a first type of data transmission;

transmit an access request to a radio network node to perform data transmission of the first type of data transmission, wherein the access request comprises an indication indicating the first type of data transmission;

receive a grant from the radio network node, wherein the grant indicates a size for granted data transmission, or comprises a type indication of type of data transmission of the granted data transmission;

compare the first size with the indicated size in the grant, or the first type of data transmission and the type of data transmission indicated by the type indication in the received grant; and based on the comparison, determine whether to use the received grant for performing data transmissions or not, wherein the first type of data transmission is small data transmission (SDT) or Early Data transmission (EDT).

10. The UE according to claim 9, wherein the indication of the first size is obtained by the UE by being configured with a number of sizes for different preambles and/or different types of data transmissions.

11. The UE according to claim 9, wherein the grant is received in a random access response.

12. The UE according to claim 9, wherein the UE is configured to, if the size in the received grant matches the first size, or the first type of data transmission matches the type of data transmission indicated by the type indication in the received grant, use resources to perform data transmission.

13. The UE according to claim 9, wherein the UE is configured to, if the size in the received grant does not match the first size, or the first type of data transmission matches the type of data transmission indicated by the type indication in the received grant, continue monitoring for a response over a time interval, or go back to resource selection.

14. A radio network node for handling communication in a wireless communications network, wherein the radio network node is configured to:

receive, from a user equipment (UE) an access request to perform data transmission of a first type; and respond to the UE with a grant of a size, wherein the size of the grant is based on the first type of data transmission, or the grant comprises a type indication of the first type of data transmission of the granted data transmission, wherein the access request comprises an indication indicating the first type of data transmission, wherein the first type of data transmission is small data transmission (SDT) or Early Data transmission (EDT).

15. The radio network node according to claim 14, wherein the radio network node is further configured to configure the UE with a first size of grants for a data transmission of the first type.

16. The radio network node according to claim 15, wherein the radio network node is configured to configure the UE with the first size by configuring the UE with a number of sizes for different preambles and/or different types of data transmissions.

17. A computer program product stored in a non-transitory computer-readable storage medium comprising instructions, which, when executed on at least one processor, cause the at least one processor to carry out the method according to claim 1.

18. A non-transitory computer-readable storage medium, having stored thereon a computer program product comprising instructions which, when executed on at least one processor, cause the at least one processor to carry out the method according to claim 1.

*    *    *    *    *